United States Patent [19]
Herman et al.

[11] Patent Number: 5,364,272
[45] Date of Patent: Nov. 15, 1994

[54] APPARATUS AND METHOD FOR TEACHING

[75] Inventors: Susan J. Herman, Dallas; Richard H. Wallace, Plano; Michel Stella, Dallas, all of Tex.; George L. Brantingham, Avezzano, Italy

[73] Assignee: Texas Instruments Incorporated, Dallas, Tex.

[21] Appl. No.: 104,298

[22] Filed: Aug. 9, 1993

[51] Int. Cl.$^5$ .............................................. G09B 1/00
[52] U.S. Cl. ..................................... 434/159; 434/169; 434/171; 434/259; 434/327; 200/5 R
[58] Field of Search ....................... 434/159, 169–172, 434/118, 201, 207, 224, 258, 259, 327, 333, 335, 340; 200/5 R, 43.05, 43.06, 52 R, 512, 514; 273/238, 239

[56] References Cited

U.S. PATENT DOCUMENTS

| | | | |
|---|---|---|---|
| 3,654,706 | 4/1972 | Perrella | 434/340 X |
| 3,854,131 | 12/1974 | Vanderheiden et al. | 200/5 R X |
| 3,883,146 | 5/1975 | Johnson et al. | 434/169 X |
| 4,425,096 | 1/1984 | Schwake | 434/201 |
| 4,609,356 | 9/1986 | Gilden et al. | 434/259 |
| 4,824,376 | 4/1989 | Arash | 434/327 X |
| 4,968,255 | 11/1990 | Lee et al. | 434/159 |
| 5,188,533 | 2/1993 | Wood | 434/171 X |
| 5,293,017 | 3/1994 | Bartlett | 200/512 X |

Primary Examiner—Richard J. Apley
Assistant Examiner—Joe H. Cheng
Attorney, Agent, or Firm—William E. Hiller; Richard L. Donaldson

[57] ABSTRACT

A teaching toy (8) includes at least one receptacle (12). Receptacle (12) has a conductive signal-out pad and a plurality of conductive code-in pads (46) at an inner surface. At least one remote unit (14) is included which is removable from receptacle (12). Remote unit (14) has multiple sides and a conductive signal-in pad for capacitive coupling to the signal-out pad. Remote unit (14) also has at least one conductive code-out pad (50) electrically connected to the signal-in pad for capacitive coupling to one of the code-in pads (46). The signal-in pad and the code-out pad (50) are disposed on a first side of unit (14). Remote unit (14) also has a datum disposed on a second side. A processor (20) is included for generating a control signal to the signal-out pad and detecting data signals from the code-in pads (46). Processor (20) associates the data signals with and generates data representing the datum. A memory (22) is included which stores instructions for operating processor (20). An interface device (27) receives the data from processor (20) and communicates the datum to a user.

20 Claims, 6 Drawing Sheets

APPARATUS AND METHOD FOR TEACHING

TECHNICAL FIELD OF THE INVENTION

The present invention relates generally to the field of electronic devices and more specifically to the field of electronic teaching devices.

BACKGROUND OF THE INVENTION

There are many devices available for teaching basic skills to children or others in need of such instruction. These devices, often called instructional, i.e. teaching, toys teach skills such as letter (of the alphabet), word, number and color recognition.

One example of a teaching toy has cubes having datum, typically in the form of a letter, digit or color, disposed on one or more of its six sides. A student places a cube in a base receptacle, and a processor within the base identifies the datum. For example, if the cube had a letter "A" disposed on a side whose datum was to be identified, the processor would identify the datum as the letter "A". The toy may use a word processor and speaker to annunciate its identification.

Typically, in the case of teaching toys having a receptacle for receiving a cube, the side of the cube opposite the side with the datum thereon has a uniquely arranged array of exposed metal contacts. When the cube is inside the receptacle, electrical contact is made between the metal contacts and exposed receiving conductors in the receptacle. The processor in the base unit recognizes the unique arrangement as a code which identifies a specific datum.

A problem with exposed metal contacts and receiving conductors is that they become tarnished and dirty from exposure to the environment. After a period of time, the accumulation of dirt hinders or prohibits electrical conduction between the contacts and conductors. Thus, the toy malfunctions until the contacts are properly cleaned.

A second problem with exposed metal contacts and conductors is that a user may come in direct contact with voltage coupled to a contact. Direct contact with this voltage can cause a painful shock to the user.

As an alternative to exposed metal contacts, an array of mechanical switches may be disposed within the receptacle. The sides of the block have unique arrangements of protrusions which close (or open) a unique combination of the switches. The processor recognizes this unique combination as a code that it matches to the specific datum on any one side.

A problem with an array of switches is that the switches wear out with time. A problem with protrusions is that one or more may become damaged and cause the toy to malfunction. Replacement or repair of the damaged switches and protrusions is economically unfeasible and may be physically impossible as well.

SUMMARY OF THE INVENTION

One aspect of the present invention is a teaching toy having at least one receptacle with a conductive signal-out pad and a plurality of conductive code-in pads at an inner surface. At least one remote unit, removable from the receptacle, has multiple sides and a conductive signal-in pad for capacitive coupling to the signal-out pad. The remote unit also has at least one conductive code-out pad electrically connected to the signal-in pad for capacitive coupling to one of the code-in pads. The signal-in pad and the code-out pad are disposed on a first side of the unit. The remote unit also has a datum disposed on a second side. A processor generates a control signal to the signal-out pad and detects data signals from the code-in pads. The processor associates the data signals with data representing the datum. A memory stores instructions for operating the processor. An interface device receives the data from the processor and communicates the datum to a user.

A technical advantage of the present invention is that no exposed conductive contacts or mechanical switches are required to transmit a code signal from a base unit to a remote unit and back again.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1-8 of the drawings, like numerals being used for like and corresponding parts of the various drawings.

Figure 1:
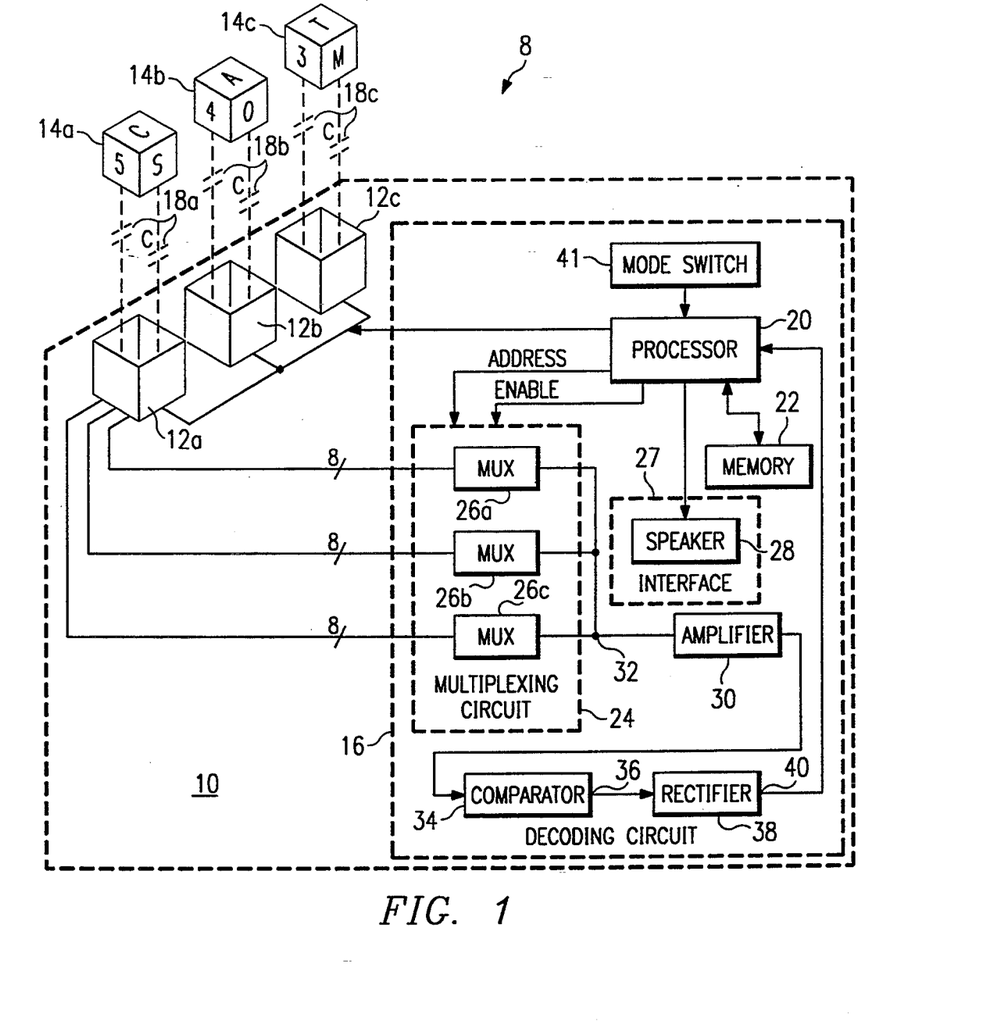
FIG. 1 is a block diagram of a teaching toy.

FIG. 1 illustrates a teaching toy 8 having a base unit 10 with a plurality of receptacles 12. Also included is a corresponding plurality of remote units 14. Here, units 14 are shown in the shape of a cube, although it is understood that various other shapes are suitable for the present invention. Here, three receptacles 12a–c and cube units 14a–c are shown, although it is understood that a teaching toy having more or less than three cube units 14 and receptacles 12 is within the scope of the invention. Base unit 10 also includes a decoding circuit 16.

Figure 2:
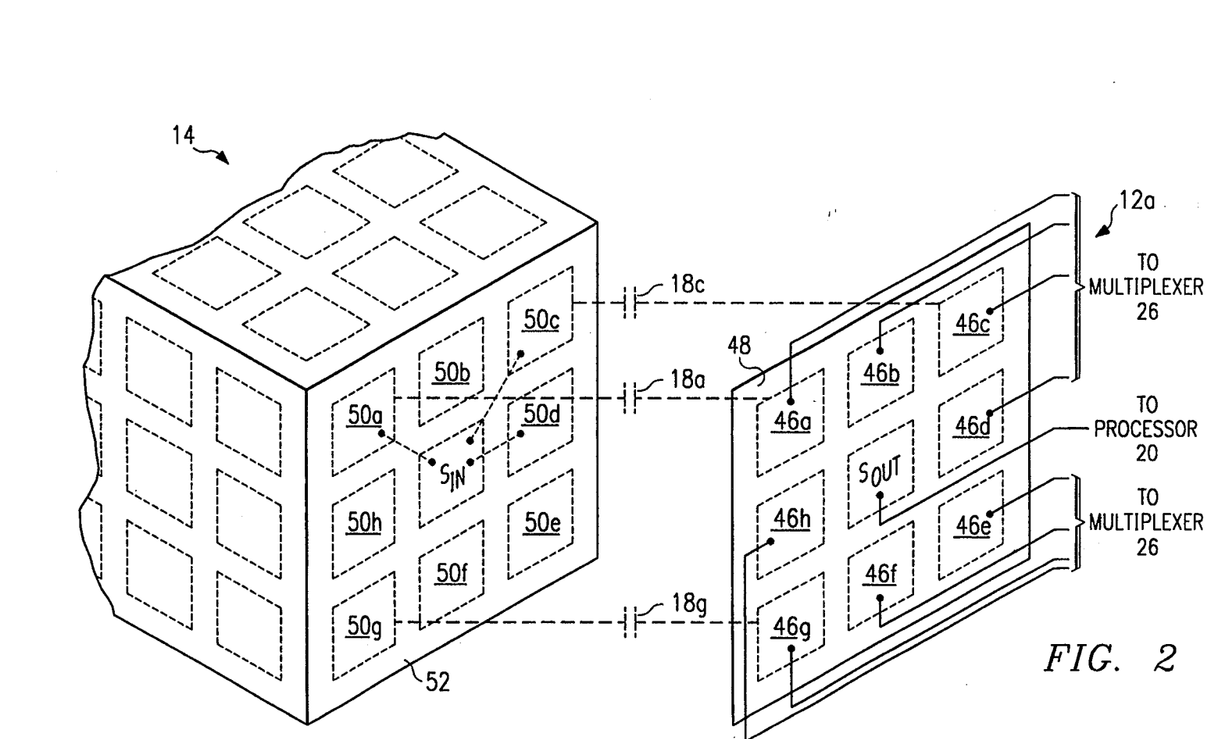
FIG. 2 illustrates the mating faces of a cube and receptacle of the teaching toy of FIG. 1.

As indicated in FIGS. 1 and 2, communication between a cube 14 and base 10 is accomplished by capacitive coupling (indicated as capacitors 18) when an outer face of a cube 14 is placed opposing an inner face of a receptacle 12. A set of conductive pads 50 is at the face of each cube 14. A set of conductive pads 46 is at an inner face of a receptacle 12. Separating pads 50 and 46 is a dielectric made from two dielectric layers 48 and 52. Layers 48 and 52 seal pads 46 and 50 respectively from the external environment. Thus, pads 46 and 50 never become worn or dirty.

In operation, each side of a cube 14 represents a datum, such as a letter of the alphabet, digit or color. As an example, cubes 14a–c of FIG. 1 are arranged so that their upward facing sides together spell the word "CAT". Decoding circuit 16 decodes the letter represented by and the relative position of each cube 14a–c via coupling capacitors 18a–c. Decoding circuit 16 includes an interface 27, having a speaker 28, to enunciate "CAT". The interface 27 could also be a graphic display for displaying such information as a picture of a cat.

Thus, teaching toy 8 can aid in the teaching of basic skills such as spelling to a student. By increasing the number of receptacles 12 and cubes 14, more complex words may be spelled. In a similar manner, counting and digit and color recognition may also be taught.

More specifically, decoder circuit 16 of FIG. 1 includes a processor 20. In one embodiment of toy 8, a Texas Instrument 50C11 speech processor is used for processor 20. However, any speech processor will suffice. In other embodiments which employ a graphic rather than an audio interface 27, a graphics processor may be used.

Processor 20 is in data communication with memory 22. Memory 22 stores an operating program to operate processor 20, codes matched to datum, sequences of alphabet letters which form words, and instructions for enunciation of the data and words. Processor 20 is also coupled to a multiplexing circuit 24. Multiplexing circuit 24 contains a plurality of multiplexers 26 which correspond to the plurality of receptacles 12. Multiplexers 26 allow processor 20 to survey each code-in pad 46 of each receptacle 12 individually.

Processor 20 is also coupled to an interface 27, which here includes a speaker 28. Processor 20 can activate speaker 28 to enunciate datum such as spelled words and instructional information as will be described more fully below.

An amplifier 30 is coupled between output terminal 32 of multiplexing circuit 24 and a comparator 34. Output terminal 36 of comparator 34 is coupled to rectifier 38. Output 40 of rectifier 38 is coupled to processor 20. The combination of amplifier 30, comparator 34 and rectifier 38 conditions a data signal received from one of the pads 46 of one of the receptacles 12 for processing by processor 20.

FIG. 2 illustrates the mating faces of a cube 14 and a receptacle 12. Each cube 14 has at least one mating face. The mating face of receptacle 12 includes a conductive signal-out pad Sout for transmitting a control signal received from processor 20. Also included are a plurality, here eight (8), of conductive code-in pads 46a–h. As shown, each of the code-in pads 46a–h is coupled to a respective input terminal of a multiplexer 26. Typically, pad Sout and code-in pads 46a–h are made out of copper, although any other electrically conductive material is suitable.

Overlaying pads Sout and 46a–h is a dielectric layer 48. Typically, dielectric layer 48 is made from ABS® or styrene, although any other plastic-type dielectric suitable for use in a child's toy can be used. Layer 48 seals pads Sout and 46a–h from the external environment. Thus, a user cannot get a "shock" from exposed voltages. Additionally, pads Sout and 46a–h remain clean and will not wear out from metal-to-metal contact with pads 50a–h.

Still referring to FIG. 2, the mating face of cube 14 includes a conductive signal-in pad Sin for receiving the capacitively coupled control signal from pad Sout. Also included is at least one, here eight (8), conductive code-out pads 50a–h. The locations at which this at least one code-out pad be disposed correspond to locations of code-in pads 46a–h. A dielectric layer 52 covers pads Sin and 46a–h and seals them from the external environment. The same materials used for dielectric layer 48 may be used for dielectric layer 52 to obtain the same advantages as previously described. Other sides of cube 14 may have a similar mating face to that described.

A predetermined set of code-out pads 50 is coupled to pad Sin. This set represents a unique code for the datum on a side of cube 14 opposite the side having the described mating face. This is due to the fact that this opposite side faces up at the user when cube 14 is installed in receptacle 12. In the example of FIG. 2, this predetermined set consists of code-out pads 50a, 50c and 50d. If code-on pads 50a–50h represented a binary string, whose values depended on whether a capacitive coupling were established with receptacle 12, the code of FIG. 2 would be 10100100.

In operation, capacitive coupling occurs between corresponding code-in pads 46 and code-out pads 50 as well as between pads Sin and Sout when cube 14 is installed in receptacle 12. This capacitive coupling forms capacitors 18. For example, capacitive coupling between pads 46a and 50a forms capacitor 18a. The value of the capacitance of a capacitor 18 is given by:

$$C = \frac{.244 KA}{D} \quad (1)$$

where K is the dielectric constant, A is the area of the smaller pad and D is the distance between the code-out and code-in pads 50 and 46 respectively. The signal transmitted via this capacitance must be of a high enough frequency to endure the effective impedance of the capacitance. This effective impedance is given by:

$$\frac{1}{2\pi f C} \quad (2)$$

where f is the signal frequency in Hertz.

In one embodiment, the area A of pads 46 and 50 is approximately 0.25 in$^2$, the dielectric constant K of layers 48 and 52 is approximately 3.0 and the distance D between each pair of pads (i.e., the combined thickness of layers 48 and 52) 46 and 52 is approximately 0.050 in. Thus, the capacitance of each capacitor 18 is approximately 3.6 pf. The signal frequency is a 100 KHz square wave, giving an effective impedance of approximately 440k ohms.

The capacitive coupling allows the control signal transmitted from Sout to flow to Sin and to the predetermined set of code-out pads (50a, 50c and 50d) to become the data signal. The data signal is then capacitively coupled back to processor 20 through the corresponding code-in pads (46a, 46c and 46d). By determining from which code-out pads 50 and code-in pads 46 the data signal is coupled back to receptacle 12, processor 20 determines the identity of the datum which is facing up from cube 14 as it rests in receptacle 12.

Figure 3:
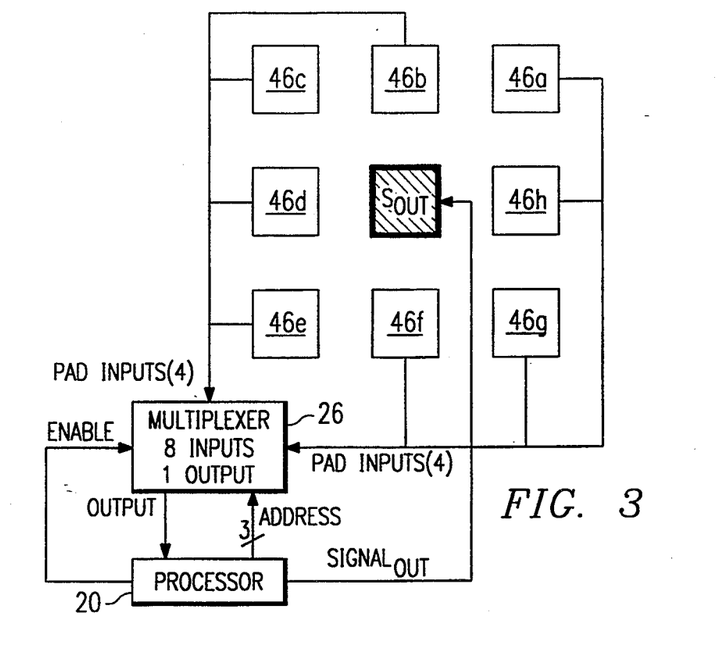
FIG. 3 is a schematic diagram of the connection between the receptacle mating face and the internal circuitry of the teaching toy of FIG. 1.

FIG. 3 is a block diagram illustrating the connection between conductive code-in pads 46a–h, signal-out pad Sout, a multiplexer 26 and processor 20. Each multiplexer 26 has an enable line and three address lines coupled to it from processor 20. Each multiplexer 26 allows processor 20 to read one code-in pad 46 from one cube 14 at a time.

Figure 4:
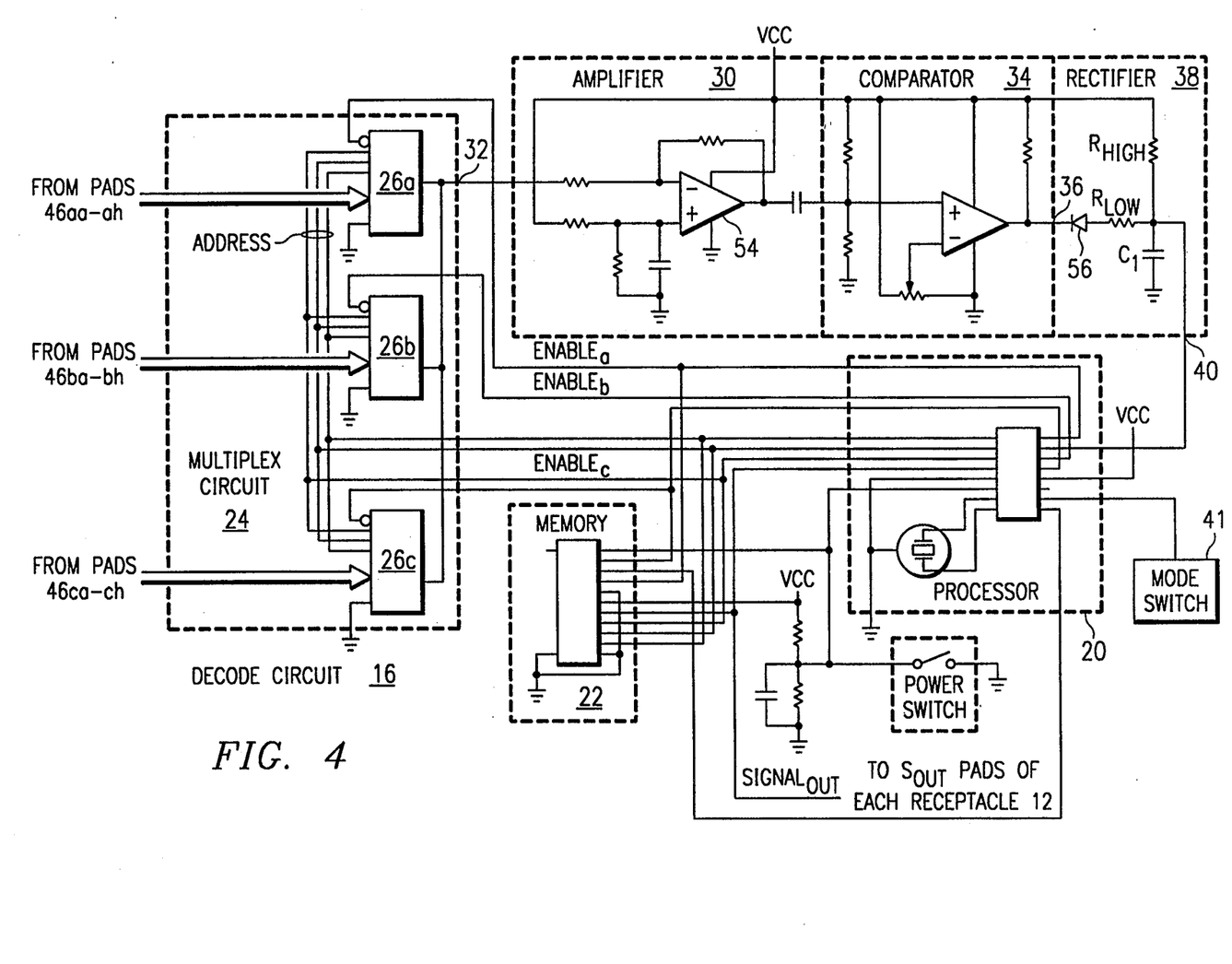
FIG. 4 is a schematic diagram of the internal circuitry of the teaching toy of FIG. 1.

FIG. 4 is a detailed schematic diagram of decoding circuit 16. Amplifier 30 includes an operational amplifier 54 arranged in an inverting configuration for amplifying and inverting the data signal received from multiplexer circuit output 32. The output of op-amp 54 is coupled to comparator 34. The output of comparator 34 is coupled to rectifier circuit 38, which includes diode 56 coupled to a relatively low resistance resistor $R_{low}$. $R_{low}$ is coupled to one end of capacitor C1 as is one end of a relatively high resistance resistor $R_{high}$. The opposing end of $R_{high}$ is coupled to power supply VCC which in this embodiment is five (+5) volts. Rectifier output 38 is then coupled to processor 20.

In operation, processor 20 enables one of the multiplexers 26a–c via corresponding enable lines Enable$_a$, Enable$_b$, and Enable$_c$. For example purposes, it will be assumed that multiplexer 26a is enabled via line Enable$_a$. Processor 20 also outputs the control signal on line Signal$_{out}$ which is coupled to the signal-out pad Sout of each receptacle 12. Via the address lines, processor 20 enables each of the eight inputs to multiplexer 26a one at a time.

Referring to FIG. 2, when processor 20 enables the multiplexer input corresponding to code-in pad 46a, the data signal will be present at output 32. The high voltage level pulses of the data signal are inverted by op-amp 54 and fed to comparator circuit 34. The occurrence of each inverted pulse causes comparator circuit 34 to output a low voltage level pulse. This low pulse causes diode 56 to become forward biased and causes a current flow through $R_{low}$ and C1. Because $R_{low}$ is a relatively low resistance, C1 will be discharged relatively quickly. Thus, the result of the data signal being received by amplifier 30 is that a low voltage, i.e. logic zero, is present across C1. This logic zero indicates to processor 20 that the data signal has been received by base unit 10 via code-out pad 50a and code-in pad 46a.

Processor 20 then changes the address value so that code-in pad 46b is coupled via multiplexer 26 to output 32. In this case, there is no connection between code-out pad 50b and signal-in pad Sin. Thus, the data signal is not received by amplifier 30. Consequently, comparator 34 outputs a high level signal to rectifier 38. Diode 56 remains in a non-conductive state and C1 is charged and held at a high level by VCC via resister $R_{high}$. This high level, i.e. logic one, indicates to processor 20 that the data signal was not returned to base unit 10 via code-out pad 50ab and code-in pad 46b.

Processor 20 continues to survey each of the eight multiplexer 26 inputs. Once its survey is complete, processor 20 can determine the predetermined set of code-out pads 50 to which signal-in pad Sin is coupled. Processor 20 proceeds to decode this information to determine the identity of the datum of interest on cube 14. This decoding is done by matching the predetermined set with sets stored in memory 22. Each of these stored sets corresponds to a datum. When a match is found, the datum corresponding to the matching set is the same as that on the upfacing side of cube 14. Here, that datum is the letter "C".

Figure 5:
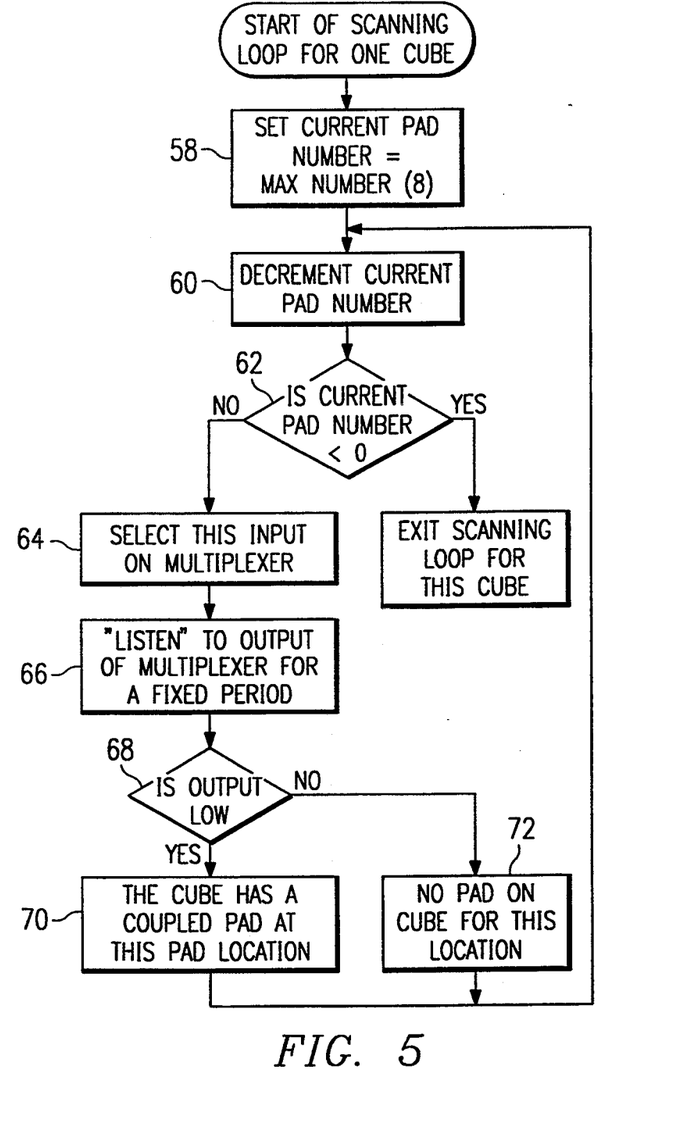
FIG. 5 is a flow diagram illustrating the steps required to determine the identity of a cube of FIG. 1.

FIG. 5 is a flow diagram of the method which processor 20 executes to conduct its survey of the code-in pads 46a–h of a receptacle 12. The same method is used for each receptacle 12a–c. As shown in block 58, a counter value "current pad number" is set equal to the number of code-in pads 46h, here eight (8). As shown in block 60, the value of "current pad number" is decremented by 1. As shown in block 62, "current pad number" is compared to zero. If the result of this comparison is that "current pad number" is less than 0, then the survey is complete and the program is exited. If "current pad number" is greater than or equal to 0, then processor 20 proceeds to the next instruction shown in block 64.

The appropriate input of multiplexer 26 is selected, and as shown in block 66, processor 20 "listens" to this input for a predetermined period of time. As shown in block 68, processor 20 determines if the output of rectifier 28 has become a logic zero during this time. If so, processor 20 determines that the corresponding code-out pad 50 on cube 14 is coupled to signal-in pad Sin. If the output is a logic one, processor 20 determines that the corresponding code-out pad 50 is not coupled to signal-in pad Sin. The programming loop is continued until the survey of all of the code-in pads 46a–h of receptacle 12 have been scanned.

Once processor 20 has decoded the identity of the datum shown on the upfacing side of cube 14a, it continues as described above to decode the upfacing datum on blocks 14b and 14c. Once the identities of all the data on blocks 14a–c have been decoded, processor 20 may perform a variety of functions. For example, as stated above, when a recognizable word is properly spelled by blocks 14a–c, processor 20 can control speaker 28 in a way such that the word is enunciated. Additionally, processor 20 can determine if the orientation of the datum is incorrect, i.e., such as upside down. Processor 20 can instruct speaker 28 to enunciate an appropriate response to indicate the misorientation, such as, "The 'A' is upside down".

Figure 6:
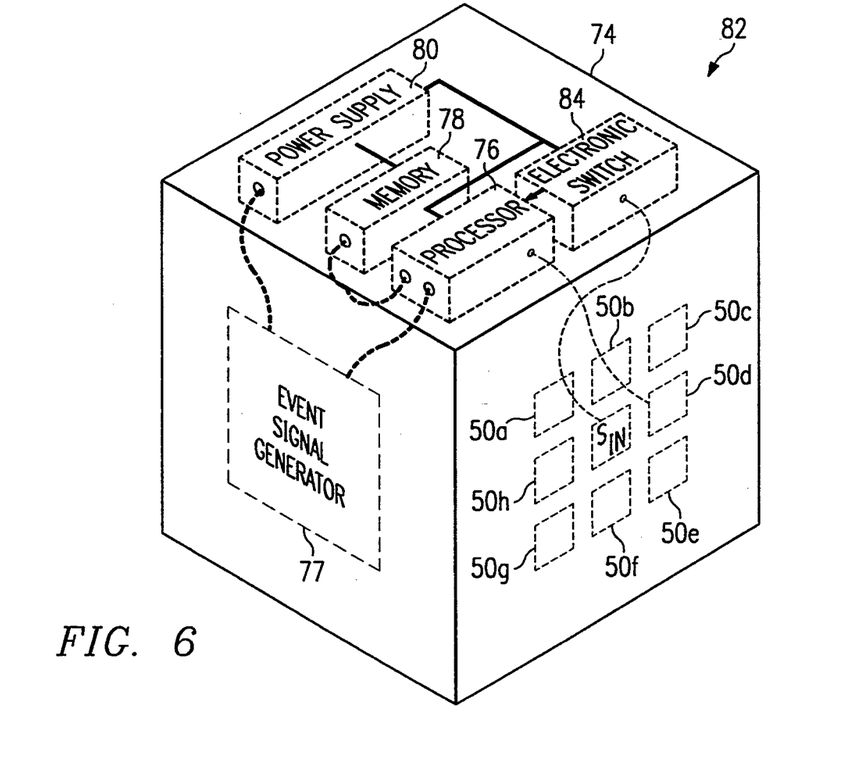
FIG. 6 is an alternative embodiment of a cube of FIG. 1.

FIG. 6 illustrates an alternate embodiment of a cube 14. Cube 74 includes a processor 76 and a memory 78 as well as a power supply 80. Typically, cube 74 has only one mating face 82. Processor 76 is coupled to a preselected code-out pad, here, 50d, of mating face 82. None of the pads 50 are coupled to signal-in pad Sin. The identity code for the datum is contained solely within the code signal generated by processor 76. Mode switch 41 (FIG. 1) must be set in the appropriate mode in order that processor 20 will "look" for this code signal. Alternatively, a certain datum chain, such as the word "out" (spelled with individual letters from cubes 14) may be used to set processor 20 in the appropriate mode.

Typically, cube 74 does not have the datum disposed thereon. Rather, cube 74 is used as an interactive toy. For example, cube 74 may have a seat (not shown) for accommodating a child's doll (not shown). When the doll is placed in the seat, an event signal is generated to processor 76. This signal is generated by event signal generator 77. Generator 77 may be a mechanical switch or a switch-like device which uses the capacitive coupling scheme as described above. Processor 76 then generates the code signal to indicate the doll is sitting in the seat. Thus, the datum, i.e. the event, in this instance is the indication that the doll is sitting in the seat. Processor 20 then decodes the code signal and can instruct speaker 28 to enunciate a message corresponding to the event, such as, "The doll is sitting in her seat."

In operation, processor 76 must first be activated, i.e., turned on. This can be accomplished in various ways. One way is to have an external switch (not shown) on cube 74 for coupling power from power supply 80 to processor 76 and memory 78. In another embodiment, an electronic switch 84 is activated by the control signal transmitted from processor 20 of base unit 10. Thus, when electronic switch 84 receives the signal, it activates processor 76. Once processor 76 is activated, it simply "waits" for the event signal. As stated above, processor 76 generates the code signal when and if it receives the event signal.

Figure 7:
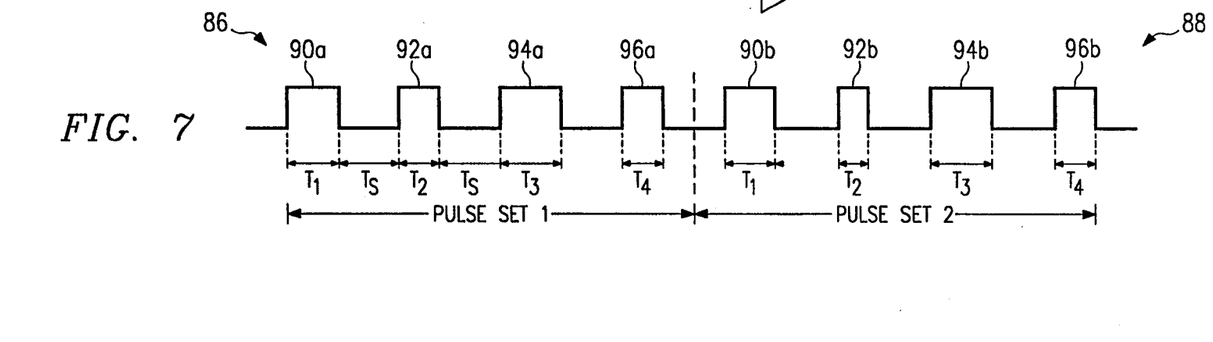
FIG. 7 is a timing diagram illustrating a code signal generated by the cube of FIG. 6.

FIG. 7 is a timing diagram which illustrates the code signal generated by processor 76. The code signal consists of two identical pulse sets 86 and 88 which are transmitted in sequence. Each pulse set includes four pulses 90, 92, 94 and 96. Each of pulses 90-96 are of durations t1, t2, t3 and t4 respectively. These durations t1-4 hold the code. That is, by measuring durations t1-4, processor 20 can identify the datum being sent by processor 76.

Typically, there is an error tolerance between duration steps. (The duration steps are related to processor 20 instruction cycle time.) For example, three consecutive duration steps may occur at 14, 20 and 26 microseconds. Any pulse having a measured duration between 17 and 23 microseconds will be recognized as being of the second step i.e., 20 microseconds. This gives a 6 microsecond "window" to account for errors such as system noise and miscalibration. Also, there is a minimum duration, for example, 10 microseconds, to prevent glitches from being counted as pulses. Any "pulse" with a duration of less than this minimum threshold is ignored by processor 20.

Figure 8:
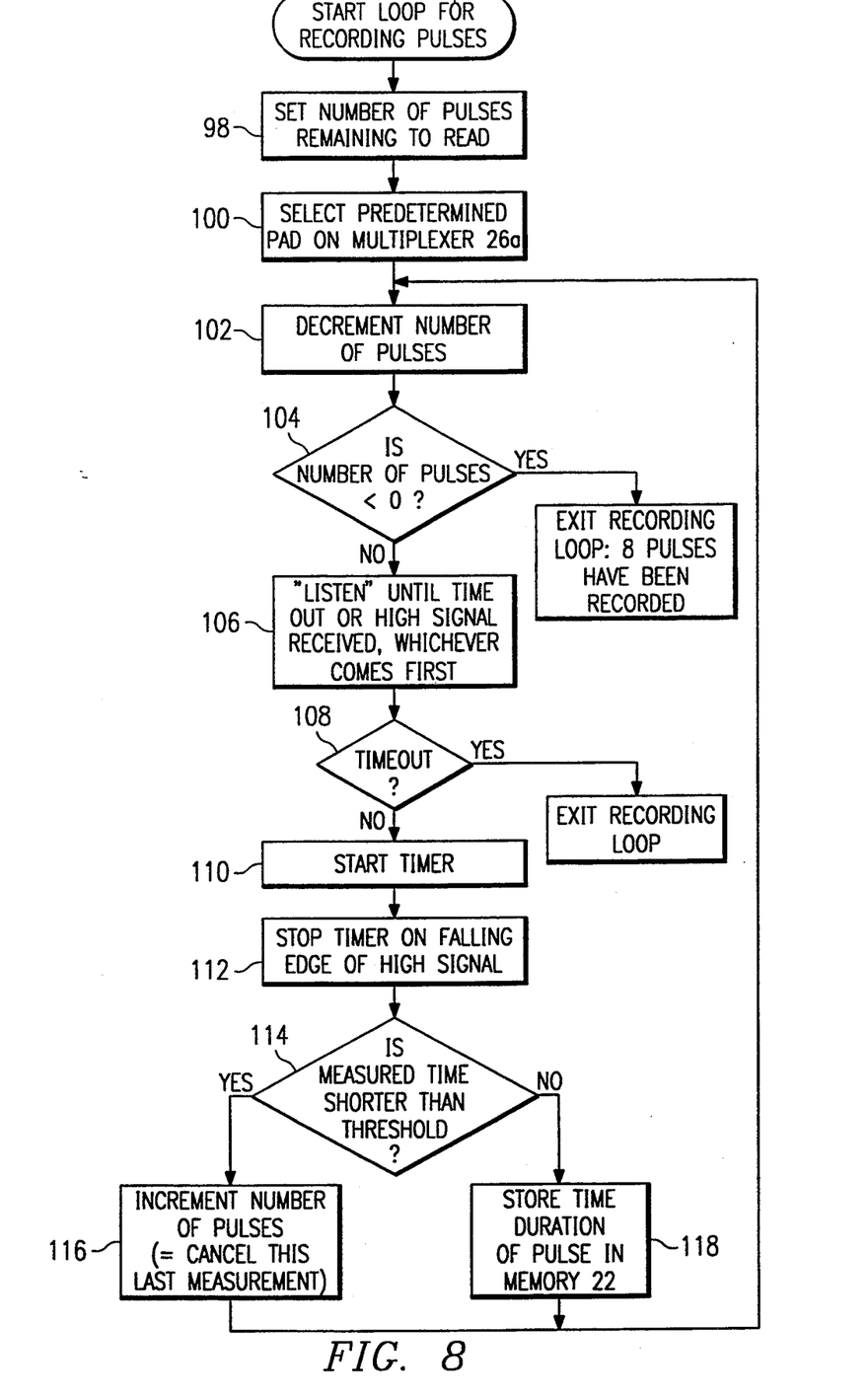
FIG. 8 is a flow diagram illustrating steps required to decipher the code signal of FIG. 7.

FIG. 8 is a flow diagram illustrating the decoding program which is executed by processor 20 to decipher the code signal output by processor 76. First, as discussed above, mode switch 41 must be set to "remote processor mode". Next, as shown in block 98, a count value "number of pulses remaining" is set to the number of pulses which will be looked for, here eight (FIG. 7). Next, as shown in block 100, processor 20 enables the predetermined code-in pad, here shown as 46ad (corresponds to code-out pad 50d when cube 74 is placed in receptacle 12a), via a multiplexer 26, here multiplexer 26a.

As shown in block 102, count value "number of pulses" is decremented by one. As shown in block 104, a comparison is made between "number of pulses" and zero. If "number of pulses" is less than zero, processor 20 has received all the pulses of the code signal and the program is exited. If "number of pulses" is greater than or equal to zero, processor 20 proceeds to block 106. Processor 20 "listens" to pad 46ad for a predetermined time or until a pulse is received whichever occurs first. As indicated in block 108, if the predetermined time expires before a pulse is received, then processor 20 exits the program, assuming no code signal has been transmitted from processor 76. If a pulse is received before a time out occurs, processor 20 proceeds to block 110.

A timer is started on the leading edge of a received pulse (block 110) and stopped on the trailing edge of the same pulse as shown in block 112. As shown in block 114, the measured time interval of the received pulse is compared to a threshold time interval. If the time interval is shorter than the threshold, then, as shown in block 116, the count value "number of pulses" is incremented to its previous value. Thus, a pulse with a duration less than the threshold is ignored by processor 20.

If the measured time interval of the received pulse is not shorter than the threshold, the time interval and count value are recorded in memory 22 as shown in block 118. The above procedure is repeated for all eight pulses of the two pulse sets 86 and 88. Processor 20 compares the measured duration of each pulse of first pulse set 86 with each corresponding pulse of second pulse set 88. For example, the duration of pulse 92a of pulse set 86 is compared to the duration of pulse 92b of pulse set 88. If the time intervals of each pair of corresponding pulses from sets 86 and 88 are identical (within tolerances as discussed above) then processor 20 has received an error-free code signal.

Processor 20 decodes the error-free code signal by matching the time intervals of each pulse 90-96 with set patterns stored in memory 22. When a match has been found, processor 20 instructs speaker 28 to enunciate the datum, or message corresponding thereto, corresponding to the matched pattern.

Although the present invention and its advantages have been described in detail, it should be understood that various changes, substitutions and alterations can be made herein without departing from the spirit and scope of the invention as defined by the appended claims. For example, pulse sets 86 and 88 may contain more or less than four pulses.

What is claimed is:

1. A teaching toy comprising:
   at least one receptacle with a conductive signal-out pad at an inner surface and a plurality of conductive code-in pads at said inner surface;
   at least one remote unit removable from said receptacle having multiple sides and a conductive signal-in pad for capacitive coupling to said signal-out pad and at least one conductive code-out pad electrically connected to said signal-in pad for capacitive coupling to one of said code-in pads, said signal-in pad and said code-out pad being disposed on a first of said multiple sides of said remote unit, said remote unit also having a datum disposed on a second of said multiple sides;
   a processor for generating a control signal to said signal-out pad, for detecting data signals from said code-in pads, for associating said data signals with said datum and for generating response data representing said datum;
   a memory, in data communication with said processor, for storing instructions for operating said processor; and
   an interface device for receiving said response data from said processor and for communicating said datum to a user.

2. The teaching toy of claim 1 wherein said sides of said remote unit and said receptacle have a shape which allows multiple orientations of said remote unit with respect to said receptacle, one of said multiple orientations being a correct orientation and the remaining of said multiple orientations being incorrect orientations, and wherein said memory stores instructions such that said processor determines, in response to said data signals, if said remote unit and said receptacle are in one of said incorrect orientations, and such that said processor instructs said interface to broadcast a message to indicate when said remote unit is in said one of said incorrect orientations.

3. The teaching toy of claim 2 wherein said shape is square.

4. The teaching toy of claim 1 wherein said remote unit further comprises a remote unit dielectric disposed on said first side for covering said signal-in and said at least one code-out pad.

5. The teaching toy of claim 1 wherein said datum is a letter of the alphabet.

6. The teaching toy of claim 1 wherein said datum is a digit.

7. The teaching toy of claim 1 wherein said datum is a color.

8. The teaching toy of claim 1 further comprising a receptacle dielectric disposed on said receptacle for covering said signal-out pad and said plurality of code-in pads.

9. The teaching toy of claim 1 further comprising a multiplexer in data communication with said processor and each of said plurality of code-in pads, for coupling, in response to an address signal from said processor, one of said code-in pads to said processor.

10. A teaching toy comprising:
at least one receptacle with at least one conductive code-in pad at an inner surface;
at least one of a first remote unit, removable from said receptacle, having multiple sides and at least one conductive code-out pad disposed on a first of said sides for capacitively coupling a code signal to said code-in pad, said remote unit having an event signal generator for generating an event signal in response to the occurrence of an event, said remote unit having a remote processor in electrical communication with said code-out pad and said generator for generating said code signal to said code-out pad in response to said event signal;
a processor, in a first mode of operation, for detecting said code signal from said code-in pad, for associating said code signal with said event and for generating data representing said event;
a memory, in data communication with said processor, for storing instructions for operating said processor; and
an interface device for receiving said data from said processor and for communicating said event to a user.

11. The teaching toy of claim 10 wherein said remote unit further comprises a remote unit dielectric disposed on said first side for covering said code-out pad.

12. The teaching toy of claim 10 further comprising a receptacle dielectric disposed on said receptacle for covering said code-in pad.

13. The teaching toy of claim 10 further comprising:
at least one of a second remote unit removable from said receptacle having multiple sides and a conductive signal-in pad for capacitive coupling to a conductive signal-out pad and at least one conductive code-out pad electrically connected to said signal-in pad for capacitive coupling to said at least one code-in pad, said signal-in pad and said code-out pad being disposed on a first of said multiple sides of said second unit, said remote unit also having a datum disposed on a second of said multiple sides; and wherein said receptacle further comprises:
said signal-out pad in electrical communication with said processor,
said processor, in a second mode of operation, for generating a control signal to said signal-out pad, for detecting data signals from said code-in pad, for associating said data signals with said datum and for generating data representing said datum;
said interface device for receiving said data from said processor and for communicating said datum to a user.

14. The teaching toy of claim 13 further comprising a mode switch for toggling said processor between said first and said second modes.

15. The teaching toy of claim 13 wherein said second remote unit further comprises a second remote unit dielectric disposed on said first side for covering said signal-in and said at least one code-out pads.

16. A method of teaching comprising the steps of:
inserting a remote unit having multiple sides into a receptacle formed in a base, said unit having a datum recorded on a first side;
generating a control signal;
capacitively coupling said control signal from said base via a conductive signal-out pad to a conductive signal-in pad disposed on a second side of said remote unit;
electrically connecting said control signal from said signal-in pad to a conductive code-out pad disposed on said second side to generate a data signal corresponding to said datum;
capacitively coupling said data signal from said code-out pad to one of a plurality of conductive code-in pads disposed on said receptacle;
delivering said data signal as a code signal to a processor;
using said processor and a memory to associate said code signal with said datum; and
communicating a message representing said datum to a user.

17. The method of claim 16 further comprising the step of multiplexing, in response to an address signal from said processor, one of said code-in pads to said processor.

18. The method of claim 16 further comprising the steps of:
shaping said remote unit and said receptacle to allow multiple orientations of said remote unit with respect to said receptacle;
inserting said remote unit into said receptacle in one of said multiple orientations;
determining through which of said code-in pads said data signal is capacitively coupled from said code-out pad;
determining whether said one of said multiple orientations is a correct orientation;
communicating said message only if said one of said multiple orientations is said correct orientation.

19. The method of claim 16 further comprising the step of disposing a remote unit dielectric on said signal-in and code-out pads.

20. The method of claim 16 further comprising the step of disposing a receptacle dielectric on said signal-out and said plurality of code-in pads.

* * * * *